United States Patent
Ji et al.

(10) Patent No.: US 11,036,586 B2
(45) Date of Patent: Jun. 15, 2021

(54) STORAGE DEVICE AND OPERATING METHOD THEREOF

(71) Applicant: SK hynix Inc., Icheon-si (KR)

(72) Inventors: Seung Gu Ji, Seoul (KR); Byeong Gyu Park, Seongnam-si (KR)

(73) Assignee: SK hynix Inc., Icheon-si (KR)

( * ) Notice: Subject to any disclaimer, the term of this patent is extended or adjusted under 35 U.S.C. 154(b) by 50 days.

(21) Appl. No.: 16/683,715

(22) Filed: Nov. 14, 2019

(65) Prior Publication Data
US 2020/0319961 A1    Oct. 8, 2020

(30) Foreign Application Priority Data

Apr. 2, 2019  (KR) .................. 10-2019-0038704

(51) Int. Cl.
*G06F 11/10*      (2006.01)
*G06F 3/06*       (2006.01)

(52) U.S. Cl.
CPC .......... *G06F 11/108* (2013.01); *G06F 3/0619* (2013.01); *G06F 11/1068* (2013.01)

(58) Field of Classification Search
CPC .... G06F 11/108; G06F 11/1068; G06F 11/10; G06F 3/0619; G06F 3/06
See application file for complete search history.

(56) References Cited

FOREIGN PATENT DOCUMENTS

| KR | 10-2017-0125178 | 11/2017 |
| KR | 10-2018-0008219 | 1/2018 |

*Primary Examiner* — Nadeem Iqbal
(74) *Attorney, Agent, or Firm* — Perkins Coie LLP

(57) ABSTRACT

The memory controller is provided to include: an operation controller configured to control memory devices to read first to third source pages and a source parity page in a source stripe and perform program operations on first to third target pages and a target parity page in a target stripe, a program data determiner configured to determine first to third program data to be programmed in the first to third target pages and to determine data read successfully from the first and second source pages as the first and second program data and determine recovery data as the third program data upon whether the read operation for the third source page has failed, and a parity calculator configured to generate calculation data by using the first and second program data, and generate the recovery data by using source parity data and the calculation data.

20 Claims, 15 Drawing Sheets

STORAGE DEVICE AND OPERATING METHOD THEREOF

CROSS-REFERENCE TO RELATED APPLICATION

This patent document claims priority to and benefits of the Korean patent application number 10-2019-0038704, filed on Apr. 2, 2019, which is incorporated herein by reference in its entirety for all purposes.

TECHNICAL FIELD

Various implementations of the disclosed technology generally relate to an electronic device, and more particularly, to a storage device and an operating method thereof.

BACKGROUND

A storage device is a device the stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments of the disclosed technology provide a storage device having improved data recovery capability and an operating method thereof.

In accordance with an aspect of the disclosed technology, there is provided a memory controller for controlling one or more memory devices including a source stripe and a target stripe, the memory controller, comprising: an operation controller configured to control the memory devices to perform read operations on first to third source pages and a source parity page in the source stripe and perform program operations on first to third target pages and a target parity page in the target stripe; a program data determiner configured to determine first to third program data to be respectively programmed in the first to third target pages based on a success of each of the read operations on the first to third source pages, and to determine data read successfully from the first and second source pages as the first and second program data and determine recovery data as the third program data upon whether the read operation for the third source page has failed; and a parity calculator configured to generate calculation data by using the first and second program data, and generate the recovery data by using source parity data stored in the source parity page and the calculation data.

In accordance with another aspect of the disclosed technology, there is provided a storage device including: one or more memory devices configured to perform read operations on first to third source pages and a source parity page, and perform program operations on first to third target pages and a target parity page; and a memory controller in communication with the one or more memory devices and configured to: determine whether the read operations on the first to third source pages have been successful, determine data read from the first and second source pages whose read operation has been successfully performed as first and second program data, respectively, generate calculation data by using the first and second program data, generate recovery data based on source parity data read from the source parity page and the calculation data, and determine the recovery data as third program data upon a determination that the read operation on the third source page is not successful, wherein the first to third program data are to be respectively programmed in the first to third target pages.

In accordance with still another aspect of the disclosed technology, there is provided a method for operating a memory controller in communication with one or more memory devices, the method comprising: providing read commands for reading first to third source pages and a source parity page in a source stripe to the one or more memory devices; determining data read from the first and second source page on which read operations have been successful as first and second program data; generating calculation data by using the first and second program data; providing program commands for storing the first and second program data in first and second target pages in a target stripe to the one or more memory devices; and generating recovery data by using source parity data read from the source parity page and the calculation data depending on whether a read operation on the third source page fails.

DETAILED DESCRIPTION

Hereinafter, exemplary embodiments of the disclosed technology will be described in detail with reference to the accompanying drawings.

Figure 1:
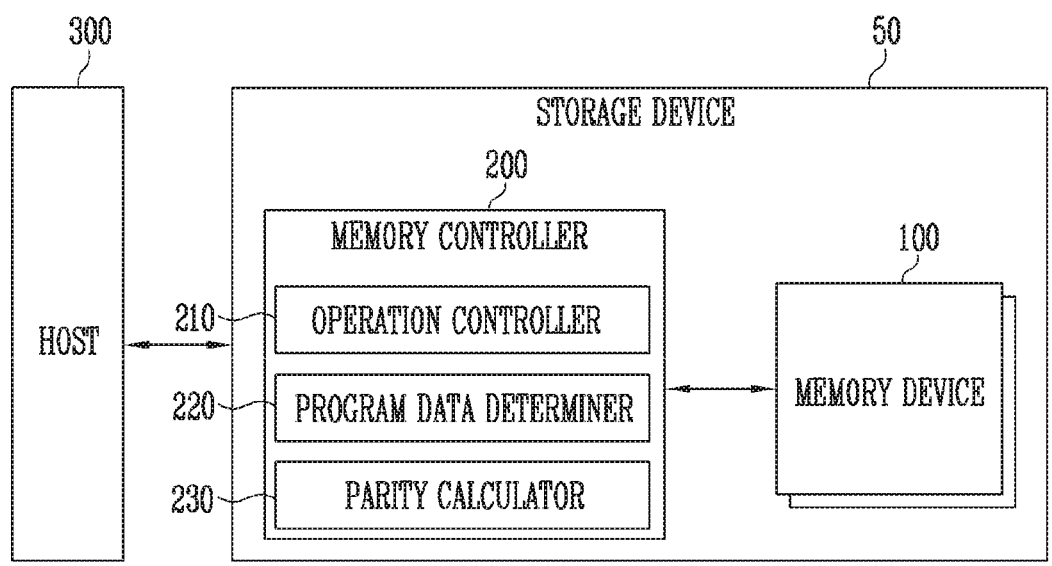
FIG. 1 is an example of a diagram illustrating a storage device in accordance with an embodiment of the disclosed technology.

FIG. 1 is a diagram illustrating a storage device in accordance with an embodiment of the disclosed technology.

Referring to FIG. 1, the storage device 50 may include a memory device 100 and a memory controller 200 configured to control an operation of the memory device 100. The storage device 50 may be a device for storing data under the control of a host 300, such as a mobile phone, a smart phone, an MP3 player, a laptop computer, a desktop computer, a game console, a TV, a tablet PC or an in-vehicle infotainment. The host 300 can include a host device which includes a host interface.

The storage device 50 may be manufactured as any one of various types of storage devices according to a host interface protocol that allows communication with the host 300. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, or others.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), or a Wafer-level Stack Package (WSP).

The memory device 100 may store data. The memory device 100 is in communication with the memory controller 200 and operates under the control of the memory controller 200. The memory device 100 may include a memory cell array including a plurality of memory cells for storing data.

Each of the memory cells may be configured as a Single Level Cell (SLC) for storing one data bit, a Multi-Level Cell (MLC) for storing two data bits, a Triple Level Cell (TLC) for storing three data bits, or a Quad Level Cell (QLC) for storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

In an embodiment, the memory controller 200 may control a plurality of memory devices 100. In some implementations, the memory controller 200 may control the memory devices 100 using a super block. The super block may indicate a set of memory blocks included in at least two different memory devices. The super block may include one or more stripes. The stripe may include a set of pages included in the super block and coupled to the same word line.

The stripe may be either a source stripe or a target stripe. In some implementations, the source stripe may refer to the stripe storing data which is to be stored in a target stripe. In an embodiment, a source stripe may include source pages and a source parity page. A target stripe may include target pages and a target parity page. Each of the source pages and the source parity page may be included in different memory devices 100 among the plurality of memory devices. Each of the target pages and the target parity page may be included in different memory devices 100 among the plurality of memory devices. The target pages may correspond to the source pages, respectively. The data structure of memory devices, which include super block, the source stripe, and/or the target stripe will be further explained later in this document with regard to FIGS. 6 and 7.

In an embodiment, the memory device 100 may be or include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or others. In this specification, for convenience of description and as an example purpose only, the memory device 100 is assumed and described as a NAND flash memory.

The memory device 100 receives a command and an address from the memory controller 200 and accesses an area selected by the address in the memory cell array. Thus, the memory device 100 may perform an operation corresponding to the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory controller 200 may control overall operations of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored.

The memory controller 200 may control the memory device 100 to perform a program operation, a read operation, an erase operation, or others in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a program command, an address, and data regardless of a request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. The memory controller 200 may control the memory devices according to an interleaving scheme so as to improve operational performance. The interleaving scheme may be or include an operating scheme that allows operating sections of at least two memory devices 100 to overlap with each other.

In an embodiment, the memory controller 200 may include an operation controller 210, a program data determiner 220, and a parity calculator 230.

The operation controller 210 may control a plurality of memory devices 100 such that a target stripe can store data stored in a source stripe. In an embodiment, the source stripe may include source pages and a source parity page. The target stripe may include a target parity page and target pages respectively corresponding to the source pages. The source parity page may store source parity data obtained by performing an exclusive OR (XOR) calculation on data stored in the source pages. The target parity page may store target parity data obtained by performing an XOR calculation on data to be stored in the target pages.

In some implementations, the operation controller 210 may control the plurality of memory devices 100 to perform read operation on the source pages and the source parity page. The operation controller 210 may acquire, from the plurality of memory devices 100, read data as a result obtained by performing the read operations.

In an embodiment, a first source page may refer to a source page among the source pages for which a read operation has been successful. A second source page may refer to a source page among the source pages for which a read operation fails. A target page corresponding to the first source page may be referred to as a first target page. A target page corresponding to the second source page may be referred to as a second target page.

Whether a read operation has been successful or has failed may be determined based on whether error correction decoding on a result obtained by performing the read operation has been successful or failed. For the error correction decoding, the memory controller may further include an error correction code (ECC) decoder (not shown) configured to perform the error correction decoding on the result read from the source pages and the source parity page. The ECC decoder is communicatively coupled to at least one of the operation controller 210, the program data determiner 220, or the parity calculator 230 and provide the results of the error correction decoding. When the error correction decoding on the result obtained by performing the read operation succeeds, it indicates that the read operation has been successful. When the error correction decoding on the result obtained by performing the read operation fails, it indicates that the read operation has failed.

The operation controller 210 may control the plurality of memory devices 100 to store program data determined by the program data determiner 220 in the target pages and the target parity page.

For example, the operation controller 210 may control the plurality of memory devices 100 to store, in the first target page, data acquired from the first source page for which the read operation has been successful. Thus, in the first target page corresponding to the first source page, data read from the first source page is to be stored under the control of the operation controller 210. In some implementations, the operation controller 210 may control the plurality of memory devices 100 to store recovery data to the second target page. Thus, in the second target page corresponding to the second source page, the recovery data is to be stored under the control of the operation controller 210. As such, the operation controller 210 may control the memory devices 100 to store either data read from a corresponding source page or recovery data in a target page based on a success of a read operation on a corresponding source page to the target page. The operation controller 210 may control the plurality of memory devices 100 to store target parity data in the target parity page.

The program data determiner 220 may determine program data to be stored in the target pages and the target parity page, based on the read data acquired from the plurality of memory devices 100.

In an embodiment, the program data determiner 220 may determine the data acquired from the first source page as program data to be stored in the first target page. The program data determiner 220 may determine recovery data generated by the parity calculator 230 as program data to be stored in the second target page. The program data determiner 220 may determine target parity data generated by the parity calculator 230 as program data to be stored in the target parity page.

The parity calculator 230 may generate calculation data, when the program data determiner 220 determines program data to be stored in the first target pages, based on the read data. The calculation data may be data obtained by an XOR calculation on the program data to be stored in the first target pages. In an embodiment, the parity calculator 230 may generate the calculation data while a program operation is being performed on the first target pages.

In an embodiment, the parity calculator 230 may generate recovery data, when any one read operation among the read operations on the source pages fails. A source page of which the one read operation has failed may be the second source page. The parity calculator 230 may generate the recovery data by performing an XOR calculation on calculation data and source parity data. The calculation data may be data that the parity calculator 230 has obtained and stored by performing an XOR calculation on the program data to be stored in the first target pages. The source parity data may be data included in the read data acquired by the operation controller 210.

The parity calculator 230 may generate target parity data obtained by performing an XOR calculation on the recovery data and the calculation data. The parity calculator 230 may perform the XOR calculation in various manners.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
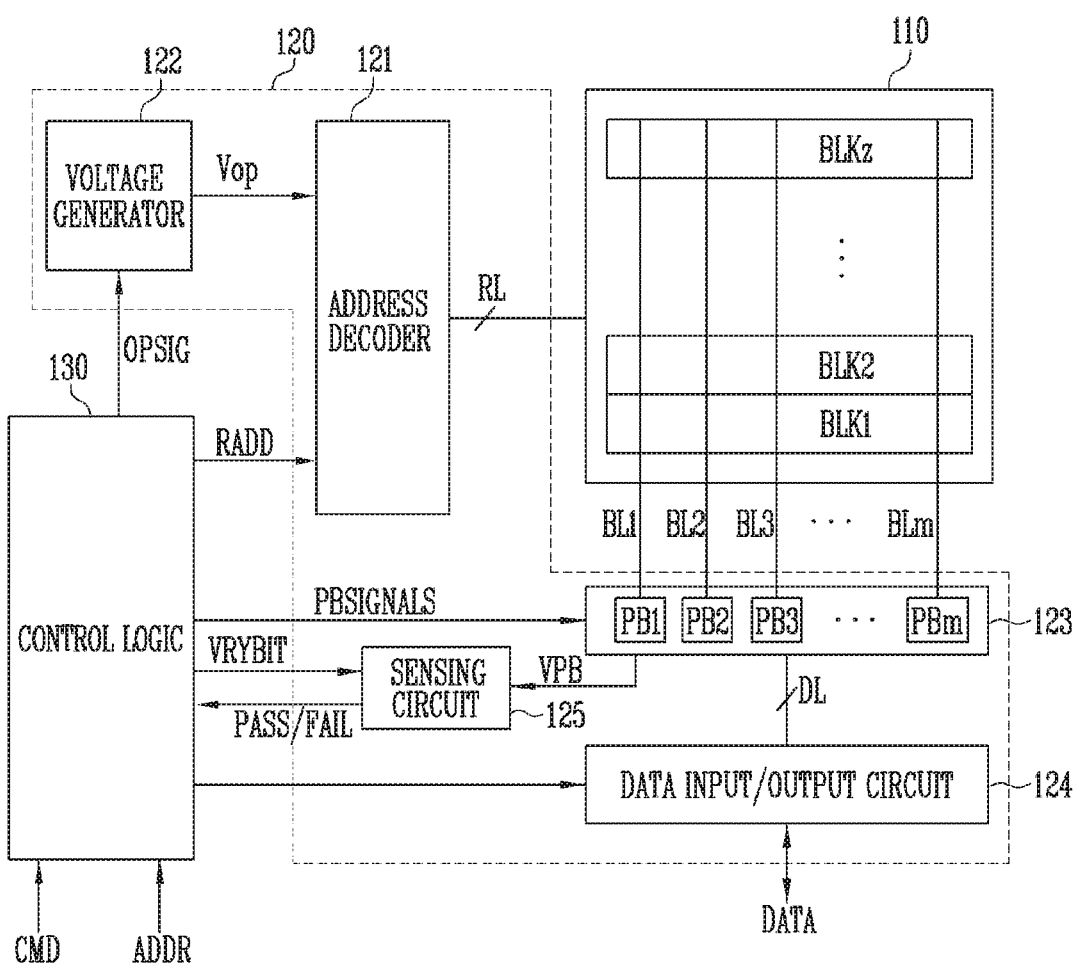
FIG. 2 is an example of a diagram illustrating a structure of a memory device shown in FIG. 1.

FIG. 2 is a diagram illustrating a structure of the memory device shown in FIG. 1.

Referring to FIG. 2, the memory device 100 may include a memory cell array 100, a peripheral circuit 120, and a control logic 130.

The memory cell array 110 includes a plurality of memory blocks BLK1 to BLKz.

The plurality of memory blocks BLK1 to BLKz are coupled to an address decoder 121 through row lines RL. The plurality of memory blocks BLK1 to BLKz are coupled to a read/write circuit 123 through bit lines BL1 to BLm. Each of the plurality of memory blocks BLK1 to BLKz includes a plurality of memory cells.

In an embodiment, the plurality of memory cells may be nonvolatile memory cells. Memory cells coupled to the same word line among the plurality of memory cells may be defined as one physical page. That is, the memory cell array 110 may be configured with a plurality of physical pages. In accordance with an embodiment of the disclosed technology, each of the plurality of memory blocks BLK1 to BLKz included in the memory cell array 110 may include a plurality of dummy cells. One or more dummy cells may be coupled in series between a drain select transistor and memory cells and between a source select transistor and the memory cells.

Each of the memory cells of the memory device may be configured as a Single Level Cell (SLC) for storing one data bit, a Multi-Level Cell (MLC) for storing two data bits, a Triple Level Cell (TLC) for storing three data bits, or a Quad Level Cell (QLC) for storing four data bits.

The peripheral circuit 120 may include the address decoder 121, a voltage generator 122, the read/write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is coupled to the memory cell array 110 through the row lines RL. The row lines RL may include drain select lines, word lines, source select lines, and a common source line. In accordance with an embodiment of the disclosed technology, the word lines may include normal word lines and dummy word lines. In accordance with an embodiment of the disclosed technology, the row lines RL may further include a pipe select line.

The address decoder 121 may operate under the control of the control logic 130. The address decoder 121 receives an address ADDR from the control logic 130.

The address decoder 121 may decode a block address in the received address ADDR. The address decoder 121 selects at least one memory block among the memory blocks BLK1 to BLKz according to the decoded block address. The address decoder 121 may decode a row address RADD in the received address ADDR. The address decoder 121 may select at least one word line of the selected memory block by applying voltages provided from the voltage generator 122 to the word line WL according to the decoded row address RADD.

In a program operation, the address decoder 121 may apply a program voltage to the selected word line, and apply a pass voltage having a level lower than that of the program voltage to unselected word lines. In a program verify operation, the address decoder 121 may apply a verify voltage to the selected word line, and apply a verify pass voltage having a level higher than that of the verify voltage to the unselected word lines.

In a read operation, the address decoder 121 may apply a read voltage to the selected word line, and apply a read pass voltage having a level higher than that of the read voltage to the unselected word lines.

In accordance with an embodiment of the disclosed technology, an erase operation of the memory device 100 is performed in units of memory blocks. In an erase operation, the address ADDR input to the memory device 100 includes a block address. The address decoder 121 may decode the block address and select one memory block according to the decoded block address. In the erase operation, the address decoder 121 may apply a ground voltage to word lines coupled to the selected memory block.

In accordance with an embodiment of the disclosed technology, the address decoder 121 may decode a column address in the address ADDR transmitted thereto. The decoded column address may be transmitted to the read/write circuit 123. In an example, the address decoder 121 may include components such as a row decoder, a column decoder, and an address buffer.

The voltage generator 122 may generate a plurality of operating voltages Vop by using an external power voltage supplied to the memory device 100. The voltage generator 122 operates under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of operating voltages Vop by using the external power voltage or the internal power voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

In order to generate a plurality of operating voltages Vop having various voltage levels, the voltage generator 122 may include a plurality of pumping capacitors for receiving the internal power voltage, and generate the plurality of operating voltages Vop by selectively activating the plurality of pumping capacitors under the control of the control logic 130.

The plurality of generated voltages Vop may be supplied to the memory cell array 110 by the address decoder 121.

The read/write circuit 123 includes first to mth page buffers PB1 to PBm. The first to mth page buffers PB1 to PBm are coupled to the memory cell array 110 through the respective first to mth bit lines BL1 to BLm. The first to mth page buffers PB1 to PBm operate under the control of the control logic 130.

The first to mth page buffers PB1 to PBm communicate data DATA with the data input/output circuit 124. In a program operation, the first to mth page buffers PB1 to PBm receive data DATA to be stored through the data input/output circuit 124 and data lines DL.

In a program operation, the first to mth page buffers PB1 to PBm may transfer, to selected memory cells through the bit lines BL1 to BLm, data DATA received through the data input/output circuit 124 when a program pulse is applied to a selected word line. The memory cells of the selected memory cells are programmed according to the transferred data DATA. A memory cell coupled to a bit line through which a program allow voltage (e.g., a ground voltage) is applied may have an increased threshold voltage. A threshold voltage of a memory cell coupled to a bit line through which a program inhibit voltage (e.g., a power voltage) is applied may be maintained. In a program verify operation, the first to mth page buffers PB1 to PBm read data DATA stored in the selected memory cells from the selected memory cells through the bit lines BL1 to BLm.

In a read operation, the read/write circuit 123 may read data DATA from memory cells of a selected page through the bit lines BL, and store the read data DATA in the first to mth page buffers PB1 to PBm.

In an erase operation, the read/write circuit 123 may float the bit lines BL. In an embodiment, the read/write circuit 123 may include a column select circuit.

In an embodiment, while data stored in some page buffers among the plurality of page buffers included in the read/write circuit 123 is being programmed in the memory cell array 110, other page buffers may receive new data from the memory controller 200 and store the new data.

The data input/output circuit 124 is coupled to the first to mth page buffers PB1 to PBm through the data lines DL. The data input/output circuit 124 operates under the control of the control logic 130.

The data input/output circuit 124 may include a plurality of input/output buffers (not shown) that receive input data DATA. In a program operation, the data input/output circuit 124 may receive data DATA to be stored from an external controller (not shown). In a read operation, the data input/output circuit 124 outputs, to the external controller, data transmitted from the first to mth page buffers PB1 to PBm included in the read/write circuit 123.

In a read operation or verify operation, the sensing circuit 125 may generate a reference current in response to an allow bit VRYBIT signal generated by the control logic 130, and output a pass signal or fail signal to the control logic 130 by comparing a sensing voltage VPB received from the read/write circuit 123 and a reference voltage generated by the reference current.

The control logic 130 may be coupled to the address decoder 121, the voltage generator 122, the read/write circuit 123, the data input/output circuit 124, and the sensing circuit 125. The control logic 130 may control overall operations of the memory device 100. The control logic 130 may operate in response to a command CMD transferred from an external device.

The control logic 130 may control the peripheral circuit 120 by generating several signals in response to a command CMD and an address ADDR. For example, the control logic 130 may generate an operation signal OPSIG, a row address RADD, a read/write circuit control signal PB SIGNALS, and an allow bit VRYBIT in response to the command CMD and the address ADDR. The control logic 130 may output the operation signal OPSIG to the voltage generator 122, output the row address RADD to the address decoder 121, output the read/write circuit control signal PBSIGNALS to the read/write circuit 123, and output the allow bit VRYBIT to the sensing circuit 125. Also, the control logic 130 may determine whether the verify operation has been successful or failed in response to the pass or fail signal PASS/FAIL output by the sensing circuit 125.

Figure 3:
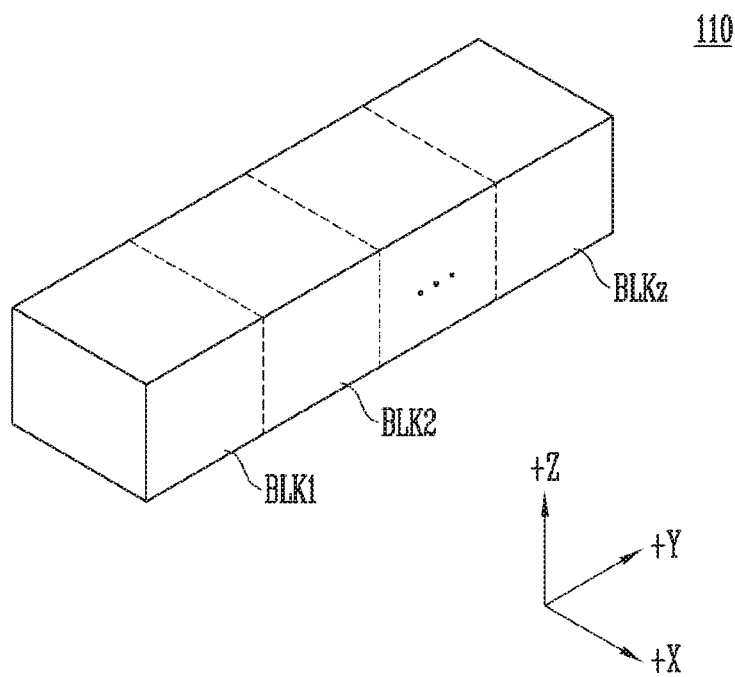
FIG. 3 is an example of a diagram illustrating an embodiment of a memory cell array shown in FIG. 2.

FIG. 3 is a diagram illustrating an embodiment of the memory cell array shown in FIG. 2.

Referring to FIG. 3, the memory cell array 110 may include a plurality of memory blocks BLK1 to BLKz. Each memory block may have a three-dimensional structure. Each memory block may include a plurality of memory cells stacked on a substrate (not shown). The plurality of memory cells may be arranged along +X, +Y, and +Z directions. A structure of each memory block will be described in more detail with reference to FIGS. 4 and 5.

Figure 4:
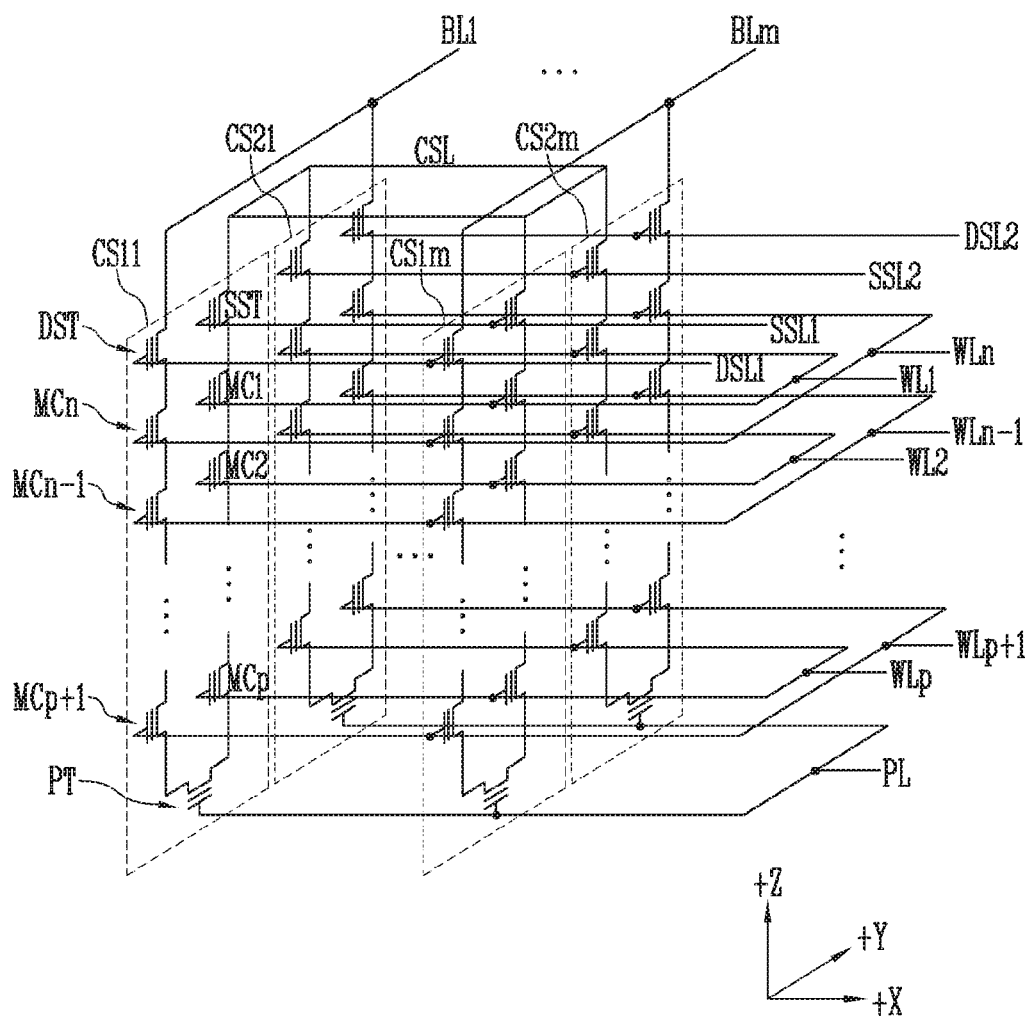
FIG. 4 is an example of a circuit diagram illustrating a memory block shown in FIG. 3.

FIG. 4 is a circuit diagram illustrating any one memory block BLKa among the memory blocks BLK1 to BLKz shown in FIG. 3.

Referring to FIG. 4, the memory block BLKa may include a plurality of cell strings CS11 to CS1$m$ and CS21 to CS2$m$. In an embodiment, each of the plurality of cell strings CS11 to CS1$m$ and CS21 to CS2$m$ may be formed in a 'U' shape. In the memory block BLKa, m cell strings are arranged in a row direction (i.e., a +X direction). FIG. 4 illustrates two cell strings arranged in a column direction (i.e., a +Y direction). However, this is for convenience of description, and it will be understood that three cell strings may be arranged in the column direction.

Each of the plurality of cell strings CS11 to CS1$m$ and CS21 to CS2$m$ may include at least one source select transistor SST, first to nth memory cells MC1 to MCn, a pipe transistor PT, and at least one drain select transistor DST.

The select transistors SST and DST and the memory cells MC1 to MCn may have structures similar to one another. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and memory cells MC1 to MCp.

In an embodiment, the source select transistors of cell strings arranged on the same row are coupled to a source select line extending in the row direction, and the source select transistors of cell strings arranged on different rows are coupled to different source select lines. In FIG. 4, the source select transistors of the cell strings CS11 to CS1$m$ on a first row are coupled to a first source select line SSL1. The source select transistors of the cell strings CS21 to CS2$m$ on a second row are coupled to a second source select line SSL2.

In another embodiment, the source select transistors of the cell strings CS11 to CS1$m$ and CS21 to CS2$m$ may be commonly coupled to one source select line.

The first to nth memory cells MC1 to MCn of each cell string are coupled between the source select transistor SST and the drain select transistor DST.

The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the opposite direction of a +Z direction, and are coupled in series between the source select transistor SST and the pipe transistor PT. The (p+1)th to nth memory cells MCp+1 to MCn are sequentially arranged in the +Z direction, and are coupled in series between the pipe transistor PT and the drain select transistor DST. The first to pth memory cells MC1 to MCp and the (p+1)th to nth memory cells MCp+1 to MCn are coupled through the pipe transistor PT. Gate electrodes of the first to nth memory cells MC1 to MCn of each cell string are coupled to first to nth word lines WL1 to WLn, respectively.

A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1m on the first row are coupled to a first drain select line DSL1. The drain select transistors of the cell strings CS21 to CS2m on the second row are coupled to a second drain select line DSL2.

Cell strings arranged in the column direction are coupled to a bit line extending in the column direction. In FIG. 4, the cell strings CS11 and CS21 on a first column are coupled to a first bit line BL1. The cell strings CS1m and CS2m on an mth column are coupled to an mth bit line BLm.

Memory cells coupled to the same word line in the cell strings arranged in the row direction constitute one page. For example, memory cells coupled to the first word line WL1 in the cell strings CS11 to CS1m on the first row constitute one page. Memory cells coupled to the first word line WL1 in the cell strings CS21 to CS2m on the second row constitute another page. As any one of the drain select lines DSL1 and DSL2 is selected, cell strings arranged in one row direction may be selected. As any one of the word lines WL1 to WLn is selected, one page may be selected in the selected cell strings.

In another embodiment, even bit lines and odd bit lines may be provided instead of the first to mth bit lines BL1 to BLm. In addition, even-numbered cell strings among the cell strings CS11 to CS1m or CS21 to CS2m arranged in the row direction may be coupled to the even bit lines, respectively, and odd-numbered cell strings among the cell strings CS11 to CS1m or CS21 to CS2m arranged in the row direction may be coupled to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. Alternatively, the at least one dummy memory cell may be provided to decrease an electric field between the drain select transistor DST and the memory cells MCp+1 to MCn. When the number of dummy memory cells increases, the reliability of an operation of the memory block BLKa is improved. On the other hand, the size of the memory block BLKa increases. When the number of dummy memory cells decreases, the size of the memory block BLKa decreases. On the other hand, the reliability of an operation of the memory block BLKa may be deteriorated.

In order to efficiently control the at least one dummy memory cell, the dummy memory cells may have a required threshold voltage. Before or after an erase operation of the memory block BLKa, a program operation may be performed on all or some of the dummy memory cells. When an erase operation is performed after the program operation is performed, a voltage applied to the dummy word lines coupled to the respective dummy memory cells is controlled, so that the dummy memory cells can have the required threshold voltage.

Figure 5:
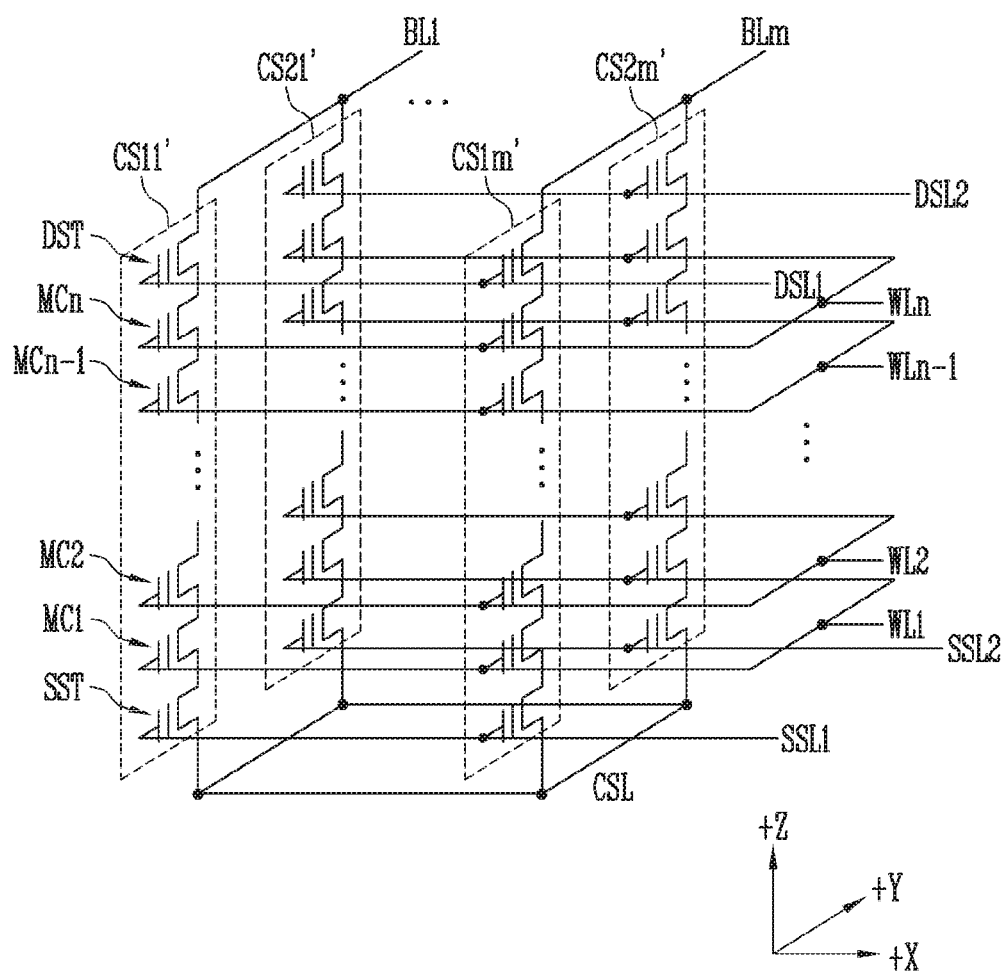
FIG. 5 is another example of a circuit diagram illustrating a memory block shown in FIG. 3.

FIG. 5 is a circuit diagram illustrating another embodiment BLKb of the one memory block among the memory blocks BLK1 to BLKz shown in FIG. 3.

Referring to FIG. 5, the memory block BLKb may include a plurality of cell strings CS11' to CS1m' and CS21' to CS2m'. Each of the plurality of cell strings CS11' to CS1m' and CS21' to CS2m' extends along the +Z direction. Each of the plurality of cell strings CS11' to CS1m' and CS21' to CS2m' includes at least one source select transistor SST, first to nth memory cells MC1 to MCn, and at least one drain select transistor DST, which are stacked on a substrate (not shown) under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1m' arranged on a first row are coupled to a first source select line SSL1. Source select transistors of the cell strings CS21' to CS2m' arranged on a second row are coupled to a second source select line SSL2. In another embodiment, the source select transistors of the cell strings CS11' to CS1m' and CS21' to CS2m' may be commonly coupled to one source select line.

The first to nth memory cells MC1 to MCn of each cell string are coupled in series between the source select transistor SST and the drain select transistor DST. Gate electrodes of the first to nth memory cells MC1 to MCn are coupled to first to nth word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1m' on the first row are coupled to a first drain select line DSL1. The drain select transistors of the cell strings CS21' to CS2m' on the second row are coupled to a second drain select line DSL2.

Consequently, the memory block BLKb of FIG. 5 has a circuit similar to that of the memory block BLKa of FIG. 4, except that the pipe transistor PT is excluded from each cell string in FIG. 5.

In another embodiment, even bit lines and odd bit lines may be provided instead of the first to mth bit lines BL1 to BLm. In addition, even-numbered cell strings among the cell strings CS11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. Alternatively, the at least one dummy memory cell may be provided to decrease an electric field between the drain select transistor DST and the memory cells MCp+1 to MCn. When the number of dummy memory cells increases, the reliability of an operation of the memory block BLKb is improved. On the other hand, the size of the memory block BLKb is increased. When the number of dummy memory cells decreases, the size of the memory block BLKb decreases. On the other hand, the reliability of an operation of the memory block BLKb may be deteriorated.

In order to efficiently control the at least one dummy memory cell, the dummy memory cells may have a required threshold voltage. Before or after an erase operation of the memory block BLKb, a program operation may be performed on all or some of the dummy memory cells. When an erase operation is performed after the program operation is performed, the threshold voltage of the dummy memory cells control a voltage applied to the dummy word lines coupled to the respective dummy memory cells is controlled, so that the dummy memory cells can have the required threshold voltage.

Figure 6:
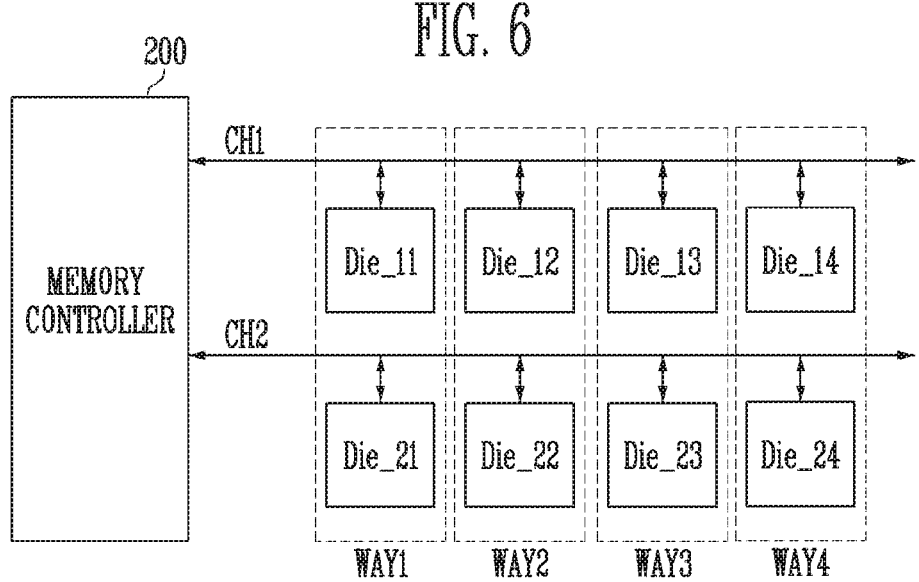
FIG. 6 is an example of a diagram illustrating an operation of a memory controller for controlling a plurality of memory devices.

FIG. 6 is an example of a diagram illustrating an operation of a memory controller for controlling a plurality of memory devices.

Referring to FIG. 6, the memory controller 200 may be coupled to a plurality of memory devices through a first channel CH1 and a second channel CH2. The number of channels and the number of memory devices coupled to each channel are not limited to this embodiment.

As a specific example, FIG. 6 shows that four memory devices Die_11, Die_12, Die_13, and Die_14 may be commonly coupled to the first channel CH1 and communicate with the memory controller 200 through the first channel CH1.

In some implementations, the memory devices Die_11, Die_12, Die_13, and Die_14 can be configured such that one of the memory devices Die_11, Die_12, Die_13, and Die_14 communicates with the memory controller 200 at a time. The memory devices Die_11, Die_12, Die_13, and Die_14 can simultaneously perform their operations without communicating with the memory controller 200.

In FIG. 6, another four memory device Die_21, Die_22, Die_23, and Die_24 may be commonly coupled to the second channel CH2 and communicate with the memory controller 200 through the second channel CH2.

In some implementations, the memory devices Die_21, the Die_22, Die_23, and Die_24 can be configured such that one of the memory devices Die_21, the Die_22, Die_23, and Die_24 communicates with the memory controller 200 at a time. The memory devices Die_21, the Die_22, Die_23, and Die_24 can simultaneously perform their operations without communicating with the memory controller 200.

The storage device using a plurality of memory devices can improve performance by using data interleaving. In order to achieve the data interleaving, the memory devices may be managed in units of channels and ways. The data interleaving may indicate data communication techniques using an interleaving scheme in a structure in which two or more ways share one channel. The data interleaving may include performing a read operation or a write operation while moving between the ways. In order to maximize parallelization of memory devices coupled to each channel, the memory controller 200 may distribute and allocate a continuous logical memory area to the channels and the ways.

For example, in FIG. 6, the memory controller 200 may transmit a control signal including a command and an address and data to the memory device Die_11 through the first channel CH1. The memory device Die_11 receives the data transmitted from the memory controller 200. While the memory device Die_11 is programming the transmitted data in a memory cell included therein, the memory controller 200 may transmit a control signal including a command and an address and data to the memory device Die_12.

As an example, in FIG. 6, the plurality of memory devices may be arranged to configure four ways WAY1 to WAY4. A first way WAY1 may include the memory devices Die_11 and Die_21. A second way WAY2 may include the memory devices Die_12 and Die_22. A third way WAY3 may include the memory devices Die_13 and Die_23. A fourth way WAY4 may include the memory devices Die_14 and Die_24.

Each of the channels CH1 and CH2 may be or correspond to a bus of signals shared and used by memory devices coupled to the corresponding channel.

Although data interleaving in a 2-channel/4-way structure is described in FIG. 6, the efficiency of data interleaving may become more efficient as the number of channels and the number of ways become greater.

Figure 7:
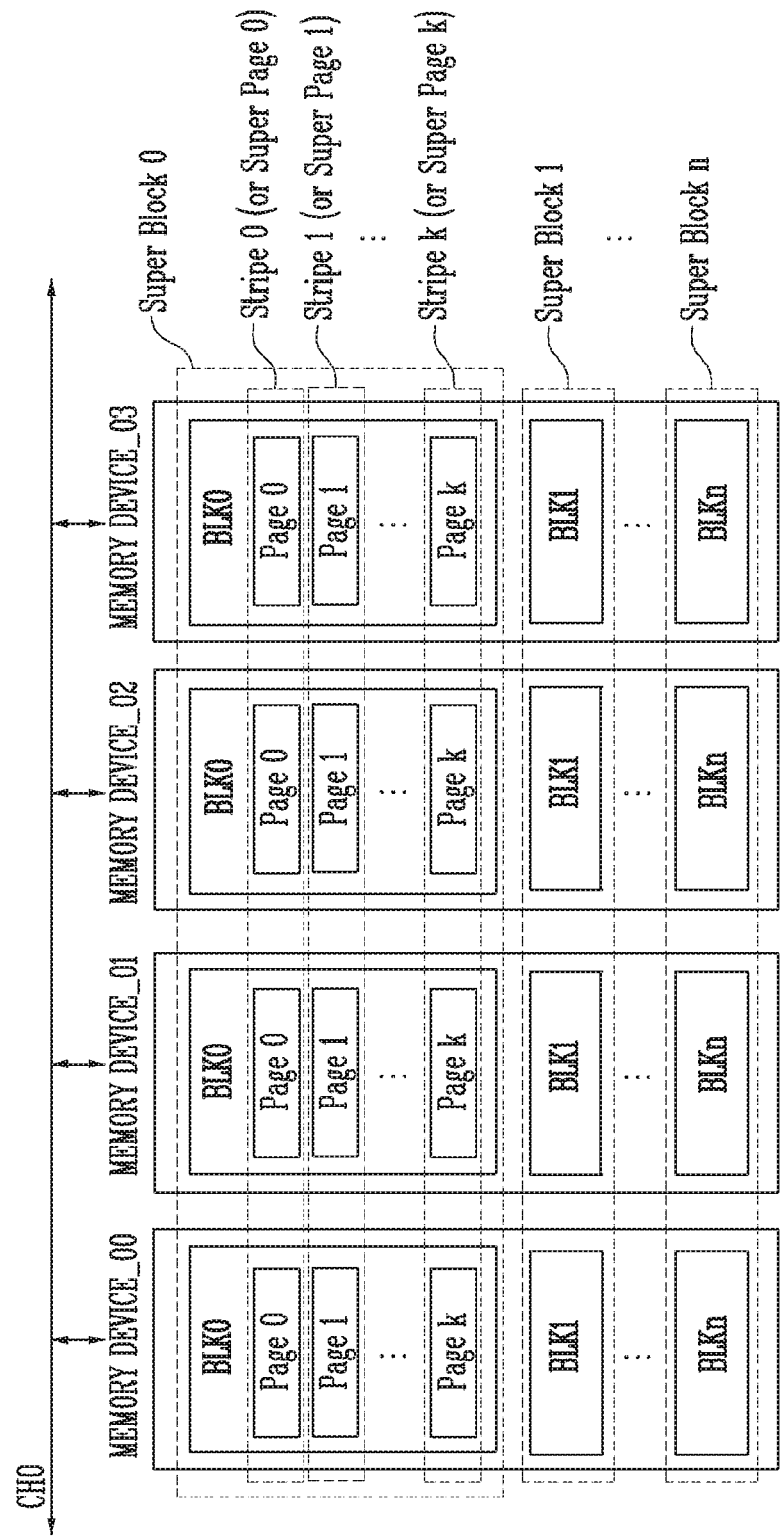
FIG. 7 is an example of a diagram illustrating a super block and a stripe.

FIG. 7 is an example of a diagram illustrating a super block and a stripe.

As an example, FIG. 7 shows that a memory device_00, a memory device_01, a memory device_02, and a memory device_03 are commonly coupled to a channel CH0.

In FIG. 7, each memory device may include one or more planes. For convenience of description, it is shown in FIG. 7 that one memory device includes one plane. One plane included in each of the memory device_00, the memory device_01, the memory device_02, and the memory device_03 may include memory blocks BLK0 to BLKn, and one memory block may include pages Page 0 to Page k.

The memory controller may control the memory devices coupled to one channel using a super block. In some implementations, the memory controller controls the memory devices in the unit of a super block. The super block may indicate a set of memory blocks included in at least two different memory devices. For example, zeroth memory blocks BLK0 included in the memory device_00 to the memory device_03 may constitute a zeroth super block Super Block 0. In this manner, the memory device_00 to the memory device_03, which are coupled to the zeroth channel CH0, may include zeroth to nth super blocks Super Block 0 to Super Block n.

One super block may be configured to include one or more stripes. The stripe may include a set of pages included in the super block and coupled to a same word line. In some implementations, the stripe can be referred to as a super page.

One stripe or super page may include a plurality of pages. For example, zeroth pages Page 0 in each of zeroth memory blocks BLK0 included in the zeroth super block Super Block 0 may constitute a zeroth stripe Stripe 0 or a zeroth super page Super Page 0.

Therefore, zeroth to kth stripes Stripe 0 to Stripe k may be included in one super block. Alternatively, zeroth to kth super pages Super Page 0 to Super Page k may be included in one super block.

When the memory controller stores data in the memory device_00 to the memory device_03 or when the memory controller reads data stored in the memory device_00 to the memory device_03, the memory controller may store or read data in the unit of stripes or super pages.

Figure 8:
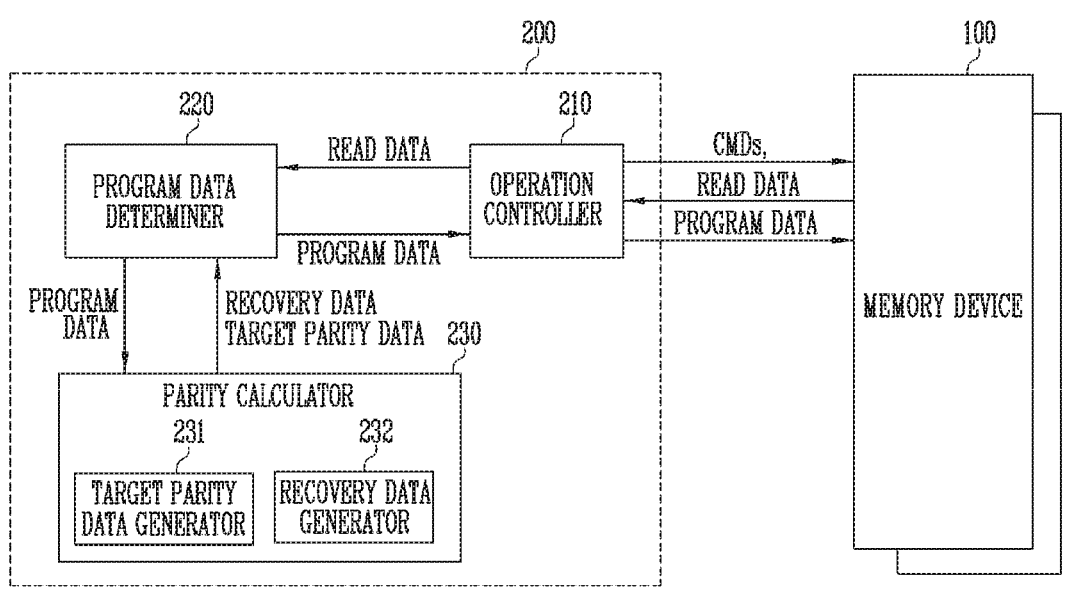
FIG. 8 is an example of a diagram illustrating a configuration and an operation of a memory controller in accordance with an embodiment of the disclosed technology.

FIG. 8 is an example of a diagram illustrating a configuration and an operation of a memory controller in accordance with an embodiment of the disclosed technology.

Referring to FIG. 8, the memory controller 200 may control a plurality of memory devices 100. The memory controller 200 may include an operation controller 210, a program data determiner 220, and a parity calculator 230.

The operation controller 210 may control the plurality of memory devices 100 such that data stored in a source stripe is copied to a target stripe.

In an embodiment, each of source pages and a source parity page, which are included in the source stripe, may be included in different memory devices 100 among the plurality of memory devices 100. Each of target pages and a target parity page, which are included in the target stripe, may be included in different memory devices 100 among the plurality of memory devices 100. The target pages may correspond to the source pages, respectively. The source parity page may store source parity data obtained by performing an XOR calculation on data stored in the source pages. The target parity page may store target parity data obtained by performing an XOR calculation on data to be stored in the target pages.

In an embodiment, a first source page among the source pages may refer to a source page for which a read operation is successful. A second source page among the source pages may be a source page for which a read operation fails. A target page corresponding to the first source page may be referred to as a first target page. A target page corresponding to the second source page may be referred to as a second target page.

Whether a read operation has been successful or failed may be determined based on whether error correction decoding on a result obtained from the read operation has been successful or failed. When the error correction decoding on the result obtained from the read operation on a corresponding source page succeeds, it is determined that the read operation on the corresponding source page has been successful. When the error correction decoding on the result from the read operation on a corresponding source page fails, it is determined that the read operation on the corresponding source page has failed.

In some implementations, whether the error correction decoding has been successful or failed may be determined based on a comparison result obtained by comparing a number of error bits included in data read using a read voltage with a number of correctable bits of an error correction decoder. When the number of error bits included in the read data is equal to or smaller than the number of correctable bits of the error correction decoder, it is determined that the error correction decoding has been successful. When the number of error bits included in the read data exceeds the number of correctable bits of the error correction decoder, it is determined that the error correction decoding has failed.

In some implementations, the operation controller 210 may provide the plurality of memory devices 100 with read commands instructing read operations on the source pages and the source parity page, which are included in the source stripe. The operation controller 100 may acquire read data as a result of read operations.

The operation controller 210 may provide the plurality of memory devices 100 with program commands for storing program data determined by the program data determiner 220 in the target pages and the target parity page, which are included in the target stripe. The plurality of memory devices 100 may operate using the interleaving scheme under the control of the operation controller 210. In some implementations, the operation controller 210 may provide, to a memory device 100, a program command for storing program data to be stored in a page of the memory device 100.

For example, the operation controller 210 may provide a program command for storing, in the first target page, data acquired from the first source page. When there exist multiple first source pages whose read operations have been successful, data acquired from the multiple first source pages may be stored in multiple first target pages corresponding to the multiple first source pages, respectively. In this case, the operation controller 210 may provide program commands for storing, in the multiple first target pages, data acquired from the multiple source pages. The operation controller 210 may provide a program command for storing recovery data in the second target page to a memory device 100 including the second target page. The operation controller 210 may provide a program command for storing target parity data in the target parity page to a memory device 100 including the target parity page.

The program data determiner 220 may determine program data to be stored in the target pages and the target parity page, based on the read data that the operation controller 210 acquires from the plurality of memory devices 100.

In an embodiment, the program data determiner 220 may determine data acquired from the first source page as program data to be stored in the first target page. The program data determiner 220 may determine recovery data generated by a recover data generator 232 as program data to be stored in the second target page. The program data determiner 220 may determine target parity data generated by a target parity data generator 231 as program data to be stored in the target parity page.

The parity calculator 230 may include the target parity data generator 231 and the recovery data generator 232.

The target parity data generator 231 may generate calculation data, when the program data determiner 220 determines program data to be stored in the first target pages, based on the read data. The program data to be stored in the first target page may be data acquired from first source page for which a read operation has been successful. The calculation data may be data obtained by performing an XOR calculation on the program data to be stored in the first target pages. In an embodiment, the target parity data generator 231 may generate the calculation data while a program operation is being performed on the first target pages.

The target parity data generator 231 may generate target parity data by using the calculation data. For multiple source pages, when read operations on the multiple source pages all have been successful, the target parity data may be the calculation data. When any one read operation among the read operations on the multiple source pages fails, the target parity data may be data obtained by performing an XOR calculation on the calculation data and recovery data. Therefore, when the one read operation fails, the target parity data generator 231 may generate target parity data obtained by performing an XOR calculation on the calculation data and the recovery data generated by the recovery data generator 232.

The recovery data generator 232 may generate recovery data, when any one read operation among the read operations on the source pages. A source page of which the one read operation has failed may be the second source page. The recovery data generator 232 may generate the recovery data by performing an XOR calculation on calculation data and source parity data. The calculation data may be data that the target parity data generator 231 has obtained and stored by performing an XOR calculation on the program data to be stored in the first target pages. The source parity data may be data included in the read data acquired by the operation controller 210.

The parity calculator 230 may perform the XOR calculation in various manners.

The parity calculator 230 may include a logical calculator (not shown) and a calculation register (not shown). The logical calculator may perform an XOR calculation on input data. The calculation register may store data obtained by performing an XOR calculation on the input data. The logical calculator may perform an XOR calculation on newly input data and data that was previously calculated and stored in the calculation register. The logical calculator may store data obtained by newly performing an XOR calculation in the calculation register. The logical calculator may perform an XOR calculation on input data accumulated in this manner.

Figure 9:
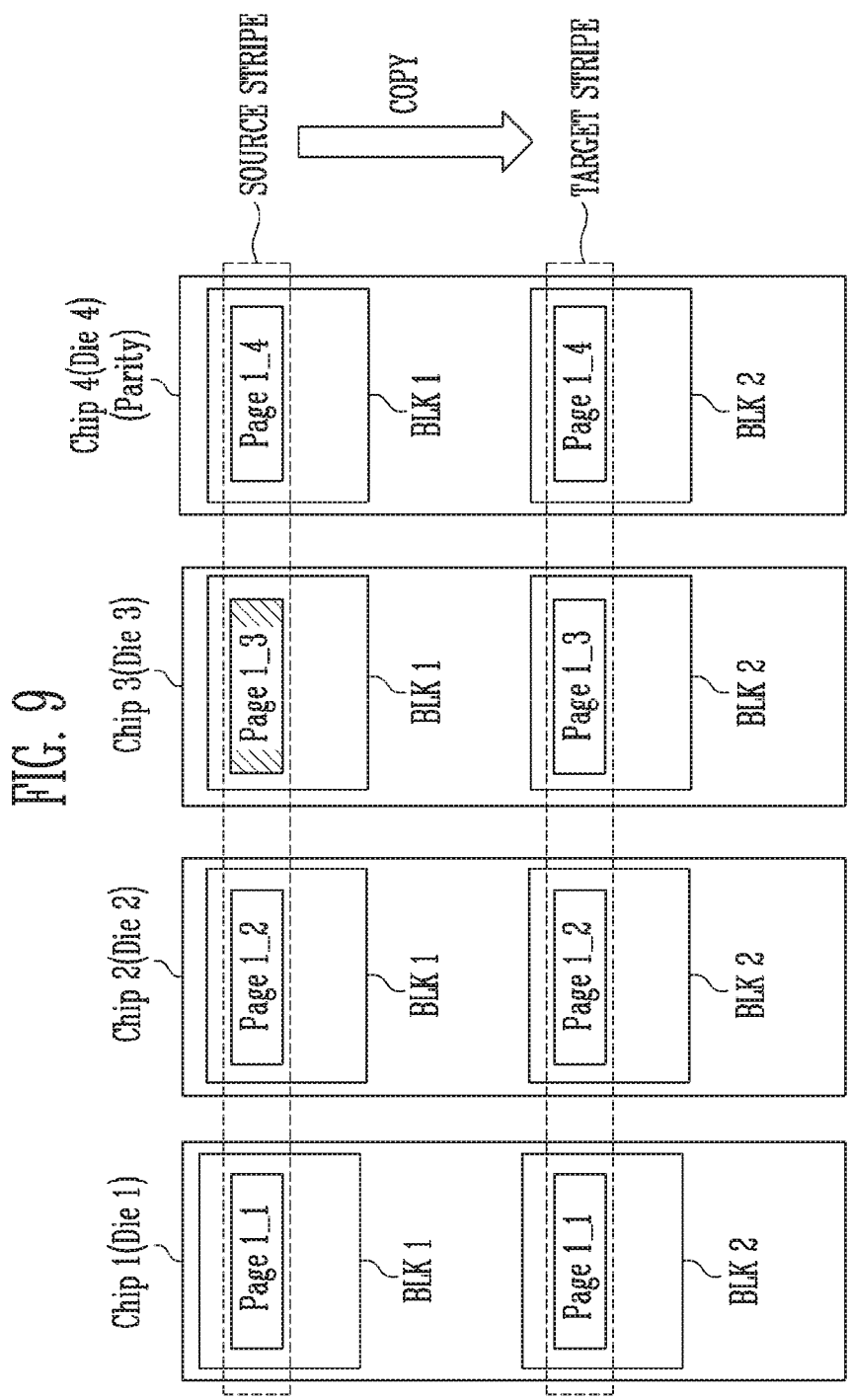
FIG. 9 is an example of a diagram illustrating a data copy operation in accordance with an embodiment of the disclosed technology.

FIG. 9 is an example of a diagram illustrating a data copy operation in accordance with an embodiment of the disclosed technology.

Referring to FIG. 9, an operation of copying data stored in a source stripe to a target stripe may be performed. In an embodiment, the data copy operation may be performed under the control of the memory controller in response to a request from the host. In another embodiment, the data copy operation may be performed under the memory controller in a background operation such as a "garbage collection" operation or wear leveling, independently from the request from the host. The term "garbage collection" as used herein may refer to a form of memory management, in which a garbage collector attempts to reclaim (garbage) memory that is occupied by objects that are no longer in use. The wear leveling indicates techniques for prolonging lifetime of erasable storage devices.

As an example, the memory devices Die 1 to Die 4 are shown in FIG. 9. Among memory devices Die 1 to Die 4, Die 4 may be allocated for parity checking and thus be referred to as a parity device. The parity device Die 4 may store data obtained by performing, for example, an XOR calculation on data stored in other memory devices. The data stored in the parity device Die 4 may be used to recover an error, when the error occurs in data stored in other memory devices. For the convenience of explanations, each memory device includes memory blocks BLK1 and BLK2 and each memory block includes a single page. The memory blocks BLK1 of the respective memory devices Die 1 to Die 4 form a source stripe and the memory blocks BLK2 of the respective memory devices Die 1 to Die 4 form a target stripe. Pages included in the memory devices Die 1 to Die 3 may be source pages. A page included in the memory device Die 4 may be a source parity page.

In an embodiment, the source parity page may include source parity data. The source parity data may be or include data obtained by performing an XOR calculation on data stored in the source pages. When an error occurs in any one of the source pages, the source parity data may be used to recover the source page in which the error occurs. Data stored in the source page in which the error occurs may be recovered by performing an XOR calculation on data stored in other source pages and the source parity data.

Pages included in the memory devices Die 1 to Die 3 may be target pages. A page included in the memory device Die 4 may be a target parity page.

First to third source pages Page 1_1 to Page 1_3 included in the memory block BLK 1 of each of the memory devices Die 1 to Die 3 may respectively correspond to first to third target pages Page 1_1 to Page 1_3 included in the memory block BLK 2 of each of the memory devices Die 1 to Die 3. The positions of memory blocks to which pages included in the source stripe correspond and the positions of the pages are not limited to this embodiment. The positions of memory blocks to which pages included in the target stripe correspond and the positions of the pages are not limited to this embodiment.

In an embodiment, each of the source pages and each of the target pages respectively corresponding to the source pages may be included in the same memory device. For example, the first source page Page 1_1 and the first target page Page 1_1 may be included in the same memory device Die 1. The second source page Page 1_2 and the second target page Page 1_2 may be included in the same memory device Die 2. The third source page Page 1_3 and the third target page Page 1_3 may be included in the same memory device Die 3. A fourth source parity page Page 1_4 and a fourth target parity page Page 1_4 may be included in the memory device Die 4 that is the same parity chip.

In another embodiment, each of the source pages and each of the target pages respectively corresponding to the source pages may be included in different memory devices. For example, assuming that first to eighth memory devices are in communication with the memory controller, the first to fourth memory devices may include source pages and a source parity page that constitute a source stripe and the fifth and eighth memory devices may include target pages and a target parity page that constitute a target stripe. For example, the first source page may be included in the first memory device, the second source page may be included in the second memory device, the third source page may be included in the third memory device, the source parity page may be included in the fourth memory device, the first target page may be included in the fifth memory device, the second target page may be included in the sixth memory device, the third target page may be included in the seventh memory device, and the target parity page may be included in the eighth memory device.

In this case, the first source page and the first target page corresponding to the first source page may be included in different memory devices. In this manner, each of other source pages and each of target pages corresponding to other source pages may be included in different memory devices.

The number of memory devices, the number of memory blocks included in the memory device, and the number of pages included in the memory block are not limited to this embodiment.

In FIG. 9, data stored in the first to third source pages, Page 1_1 to Page 1_3, included in the source stripe may be copied to the first to third target pages, Page 1_1 to Page 1_3, included in the target stripe. Read operations on the first to third source pages, Page 1_1 to Page 1_3, may be performed so as to achieve the data to be copied.

It is assumed that, among the read operations on the first to third source pages, Page 1_1 to Page 1_3, the read operations on the first and second source pages, Page 1_1 and Page 1_2, have been successful and the read operation on the third source page, Page 1_3, has failed. Data acquired from the first and second source pages, Page 1_1 and Page 1_2, for which the read operations have been successful may be determined as program data to be programmed in the corresponding target pages.

The data acquired from the first and second source pages, Page 1_1 and Page 1_2, which is determined as the program data, may be programmed in the first and second target pages, Page 1_1 and Page 1_2, respectively. The first and second target pages, Page 1_1 and Page 1_2, correspond to the first and second source pages, Page 1_1 and Page 1_2, respectively.

In an embodiment, when program data is determined, calculation data obtained by performing an XOR calculation on data to be stored in the first and second target pages, Page 1_1 and Page 1_2, which is determined as the program data, may be generated. In another embodiment, the calculation data may be generated while a program operation is being performed on the first and second target pages, Page 1_1 and Page 1_2.

Data acquired from the third source page, Page 1_3, for which the read operation fails does not constitute program data. Instead of the data acquired from the third source page Page 1_3, recovery data, which is obtained using the source parity data stored in the source parity page, Page 1_4, may be determined as program data to be stored in the third target page, Page 1_3, corresponding to the third source page, Page 1_3.

The recovery data may be obtained by performing an XOR calculation on source parity data and calculation data. The source parity data, which is stored in the source parity page, Page 1_4, may be obtained by performing an XOR calculation on data stored in the first to third source pages, Page 1_1 to Page 1_3. The calculation data may be obtained by performing an XOR calculation on data to be stored in the first and second target pages, Page 1_1 and Page 1_2.

The recovery data may be generated when any one read operation among the read operations on the first to third source pages, Page 1_1 to Page 1_3 fails.

The target parity data may be determined as program data to be stored in the fourth target parity page, Page 1_4. The target parity data may be obtained by performing an XOR calculation on data to be stored in the first to third target pages, Page 1_1 to Page 1_3. The target parity data may be obtained by performing an XOR calculation on the calculation data and the recovery data.

Figure 10:
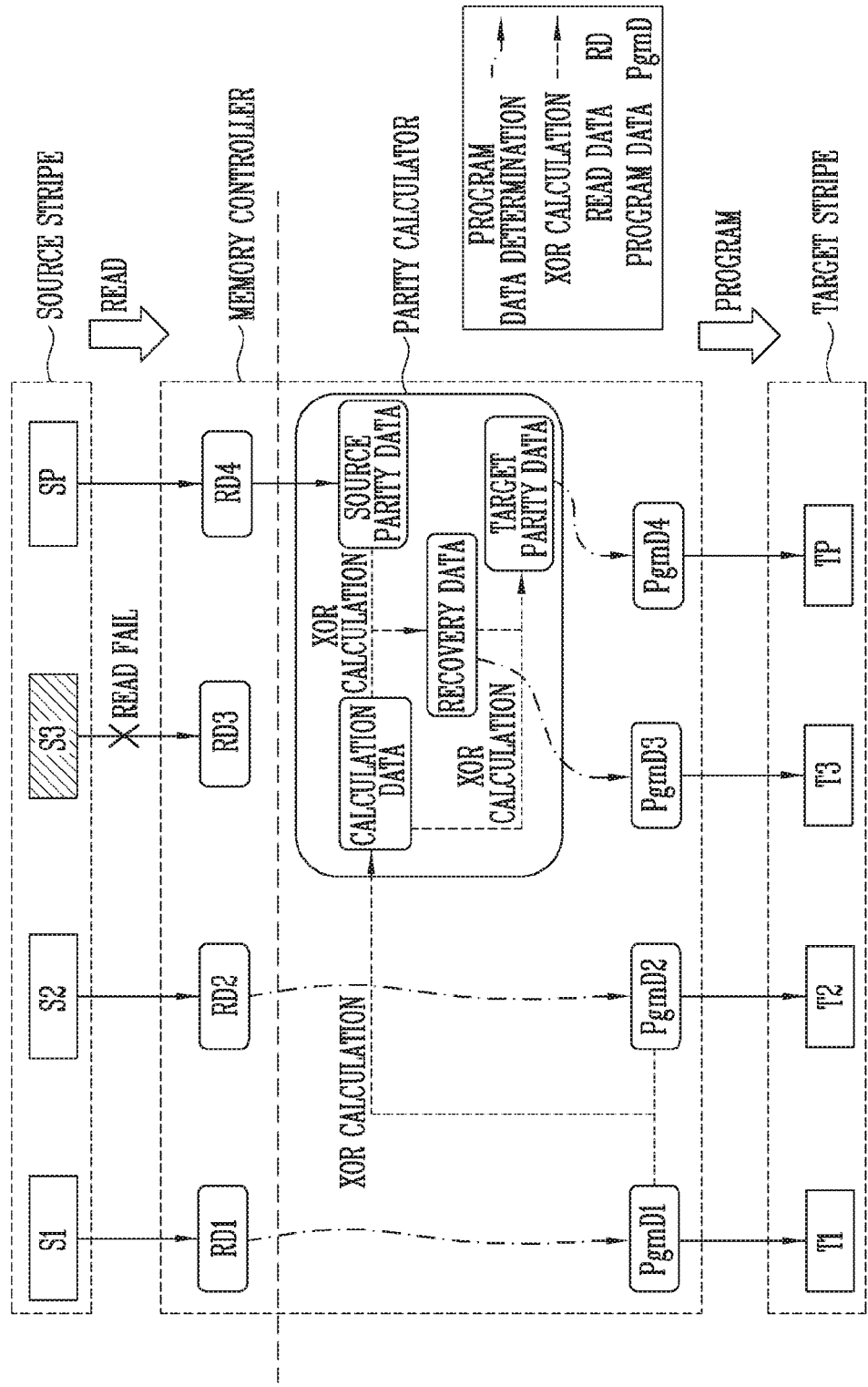
FIG. 10 is an example of a diagram illustrating a data copy operation shown in FIG. 9.

FIG. 10 is an example of a diagram illustrating a data copy operation shown in FIG. 9.

Referring to FIG. 10, the source stripe may include first to third source, pages S1 to S3, and a source parity page, SP. The target stripe may include first to third target pages, T1 to T3, and a target parity page, TP. The first to third source pages, S1 to S3, may correspond to the first to third target pages, T1 to T3, respectively.

Data stored in the first to third source pages, S1 to S3, may be copied to the first to third target pages, T1 to T3. In some implementations, the data stored in the first to third source pages, S1 to S3, may be read. The data read from the first to third source pages, S1 to S3, may be referred to as the first to third read data, RD1 to RD3. Data obtained by reading source parity data stored in the source parity page, SP, may be referred to as the fourth read data, RD4. Program data to be stored in the first to third target pages, T1 to T3, may be referred to as the first to third program data, PgmD1 to PgmD3. Target parity data to be stored in the target parity page, TP, may be referred to as the fourth program data, PgmD4.

In FIG. 10, read operations on the first to third source pages, S1 to S3, and the source parity pages, SP, may be performed. In the example as shown in FIG. 10, the read operations on the first and second source pages, S1 and S2, and the source parity page, SP, have been successful and the read operation on the third source page, S3, have failed.

Whether a read operation has been successful or failed may be determined based on whether an error correction decoding performed on the read data obtained by performing the read operation has been successful or failed. When the error correction decoding on the read data succeeds, it indicates that the corresponding read operation has been successful. When the error correction decoding on the read data fails, the read operation has failed.

In the example of FIG. 10, the read operations on the first and second source pages, S1 and S2, have been successful. The first read data, RD1, read from the first source page, S1, may be determined as the first program data, PgmD1, to be stored in the first target page, T1. The second read data, RD2, read from the second source page, S2, may be determined as the second program data, PgmD2, to be stored in the second target page, T2.

The parity calculator described with reference to FIG. 8 may generate calculation data by performing an XOR calculation on the first and second program data, PgmD1 and PgmD2, to be stored in the first and second target pages, T1 and T2, respectively corresponding to the first and second pages, S1 and S2. The parity calculator may generate calculation data when read data read from corresponding source pages is determined as program data to be stored in target pages. For example, the parity calculator may generate calculation data when the first and second read data, RD1 and RD2, are determined as the first and second program data, PgmD1 and PgmD2.

The calculation data may be used to generate target parity data to be stored in the target parity page, TP. The calculation data may be used to recover data stored in the third source page, S3, for which the read operation has failed.

The parity calculator may generate recovery data when any read operation fails. For example, the parity calculator may generate recovery data when the read operation on the third source page, S3, failed.

The parity calculator may generate recovery data by performing an XOR calculation on calculation data and source parity data. The source parity data may be obtained by performing an XOR calculation on data stored in the source pages. For example, the source parity data may be obtained by performing an XOR calculation on data stored in the first to third source, pages S1 to S3. The recovery data may be determined as the third program data, PgmD3, to be stored in the third target page, T3, corresponding to the third source page, S3, for which the read operation fails.

The parity calculator may generate target parity data. The target parity data may be the fourth program data, PgmD4, to be stored in the target parity data, TP. The target parity data may be obtained by performing an XOR calculation on data to be stored in the target pages. For example, the target parity data may be obtained by performing an XOR calculation on the first to third program data, PgmD1 to PgmD3, to be stored in the first to third target pages, T1 to T3.

The target parity data may be obtained by performing an XOR calculation on calculation data and recovery data. The calculation data may be obtained by performing an XOR calculation on the first and second program data, PgmD1 and PgmD2, to be stored in the first and second target pages, T1 and T2. The recovery data may be the third program data, PgmD3, to be stored in the third target page, T3.

The target parity data may be used to recover an error, when the error occurs in data stored in any target page among the first to third target pages, T1 to T3.

In FIG. 10, program operations of storing the first to fourth program data, PgmD1 to PgmD4, may be performed. The first to fourth program data, pgmD1 to pgmD4, correspond to the first to third target pages, T1 to T3, and the target parity page, TP, respectively.

Figure 11:
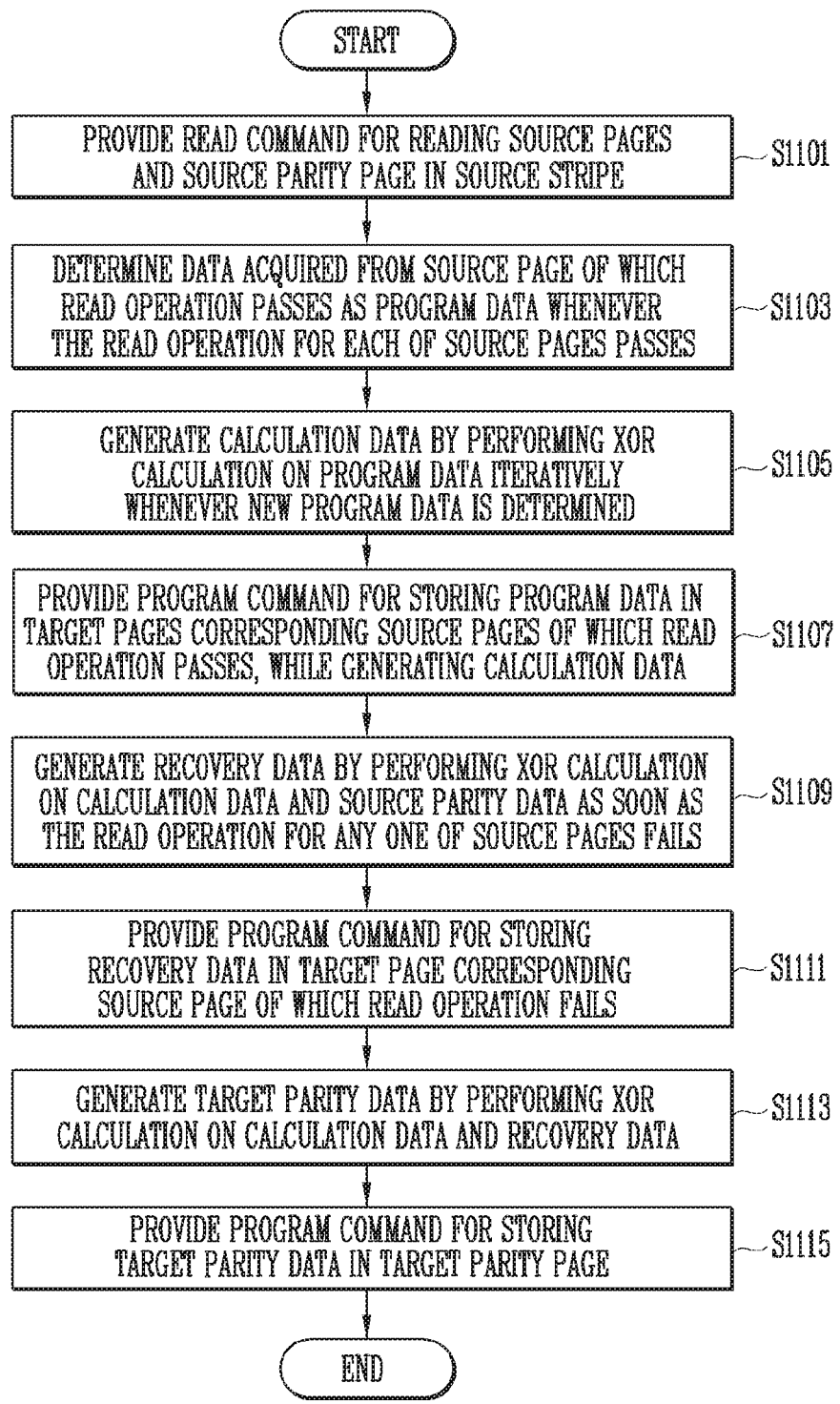
FIG. 11 is an example of a flowchart illustrating an operation of a memory controller in accordance with an embodiment of the disclosed technology.

FIG. 11 is an example of a flowchart illustrating an operation of a memory controller in accordance with an embodiment of the disclosed technology. The memory controller may perform the operation described in FIG. 11 when data transfer is needed during a garbage collection.

Referring to FIG. 11, in step S1101, the memory controller may provide a plurality of memory devices with a read command for reading source pages and a source parity page, which are included in a source stripe.

In step S1103, the memory controller may determine data acquired from a source page for which a read operation has been successful as program data to be stored in a target page. The target page may correspond to the source page. The pass of the read operation may mean the success of the read operation.

In step S1105, the memory controller may generate calculation data by performing XOR calculation on program data iteratively whenever new program data is determined.

In step S1107, the memory controller may provide program commands for storing program data in the target pages corresponding source pages of which read operation passes, while generating calculation data.

In step S1109, the memory controller may generate recovery data obtained by performing an XOR calculation on the calculation data and source parity data as soon as the read operation for any one of source pages fails. The memory controller may acquire the source parity data as a result obtained by performing a read operation on the source parity page.

In step S1111, the memory controller may provide with the plurality of memory devices with a program command for storing the recovery data in a target page corresponding to a second source page of which a read operation fails among the source pages.

In step S1113, the memory controller may generate target parity data obtained by performing an XOR calculation on the calculation data and the recovery data.

In step S1115, the memory controller may provide the plurality of memory devices with a program command for storing the target parity data in a target parity page.

Figure 12:
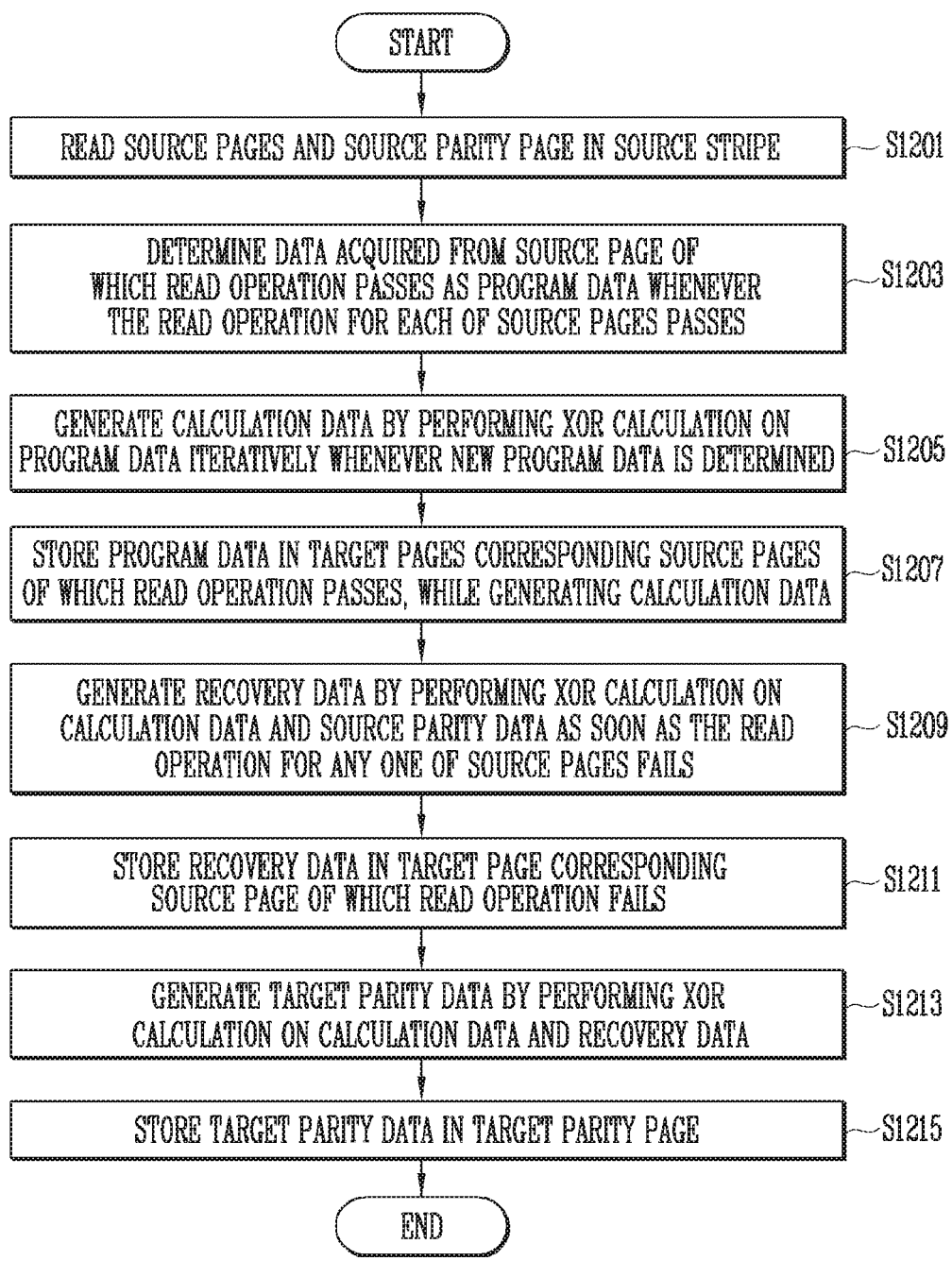
FIG. 12 is an example of a flowchart illustrating an operation of a storage device in accordance with an embodiment of the disclosed technology.

FIG. 12 is an example of a flowchart illustrating an operation of the storage device in accordance with an embodiment of the disclosed technology. The storage device may perform the operation described in FIG. 12 when data transfer is needed during a garbage collection.

Referring to FIG. 12, in step S1201, the storage device may read source pages and a source parity page, which are included in a source stripe.

In step S1203, the storage device may determine data acquired from a source page for which a read operation is successful as program data to be stored in target pages. The pass of the read operation may mean the success of the read operation.

In step S1205, the storage device may generate calculation data by performing XOR calculation on program data iteratively whenever new program data is determined.

In step 1207, the storage device may store the program data in target page corresponding source page of which read operation passes, while generating calculation data.

In step S1209, the storage device may generate recovery data by using the calculation data and source parity data as soon as the read operation for any one of source pages fails. The storage device may generate recovery data obtained by performing an XOR calculation on previously generated calculation data and source parity data read from the source parity page.

In step S1211, the storage device may store the recovery data in a target page corresponding to a source page for which a read operation fails among the source pages.

In step S1213, the storage device may generate target parity data obtained by performing an XOR calculation on the calculation data and the recovery data. The target parity data may be data obtained by performing an XOR calculation on data to be stored in the target pages.

In step S1215, the storage device may store the target parity data in a target parity page.

Figure 13:
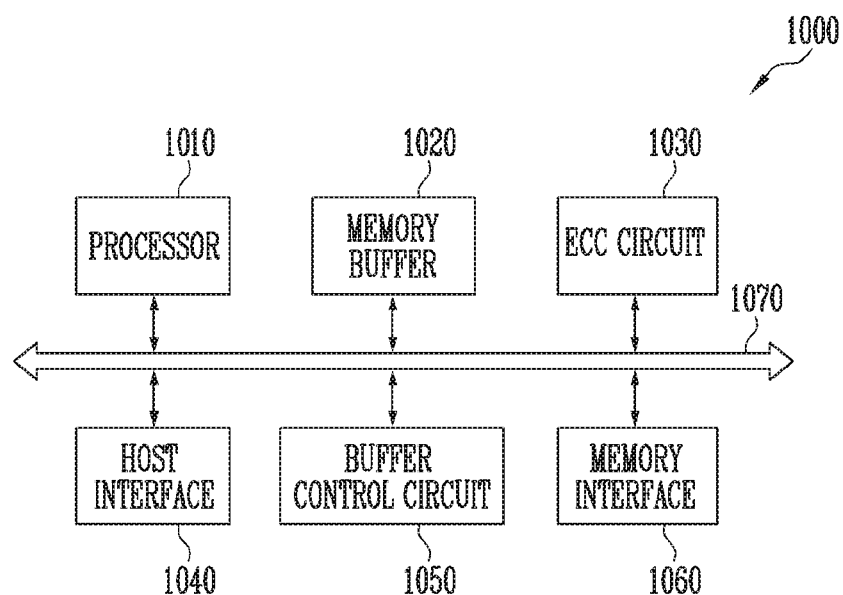
FIG. 13 is an example of a diagram illustrating another embodiment of the memory controller shown in FIG. 1.

FIG. 13 is an example of a diagram illustrating another embodiment of the memory controller shown in FIG. 1.

Referring to FIG. 13, a memory controller 1000 is coupled to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LPA, using a mapping table, to be translated into a PBA. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

In a read operation, the processor 1010 is configured to derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory Express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 14:
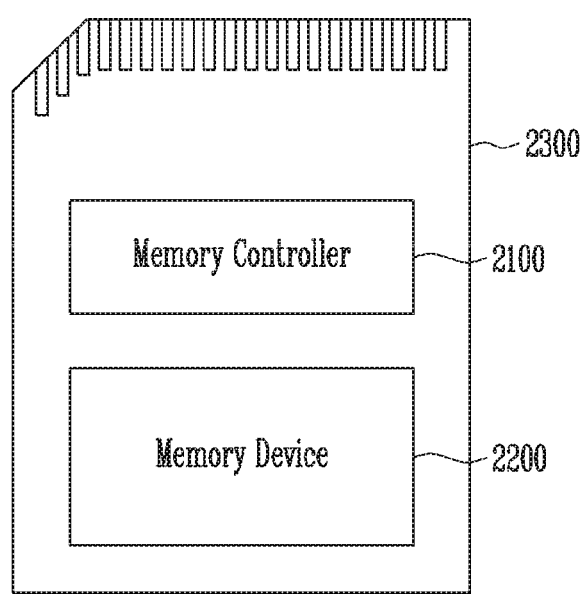
FIG. 14 is an example of a block diagram illustrating a memory card system to which a storage device is applied in accordance with an embodiment of the disclosed technology.

FIG. 14 is a block diagram illustrating a memory card system to which the storage device is applied in accordance with an embodiment of the disclosed technology.

Referring to FIG. 14, the memory card system 2000 includes a memory controller 2100, a memory device, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to driver firmware for controlling the memory device 2200. The memory controller 2100 may be implemented identically to the memory controller 200 described with reference to FIG. 1.

In an example, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 15:
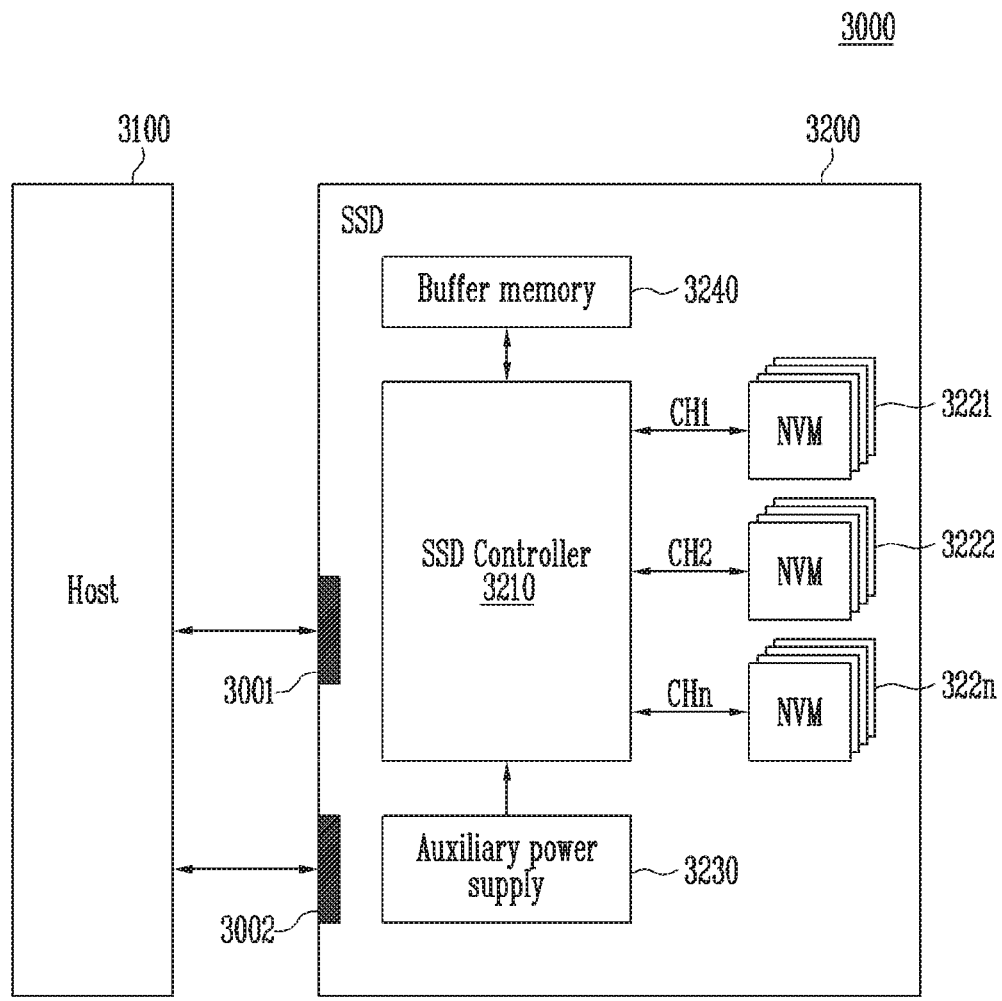
FIG. 15 is an example of a block diagram illustrating a Solid State Drive (SSD) system to which a storage device is applied in accordance with an embodiment of the disclosed technology.

FIG. 15 is a block diagram exemplarily illustrating a Solid State Drive (SSD) system to which the storage device is applied in accordance with an embodiment of the disclosed technology.

Referring to FIG. 15, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322$n$, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322$n$ in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 16:
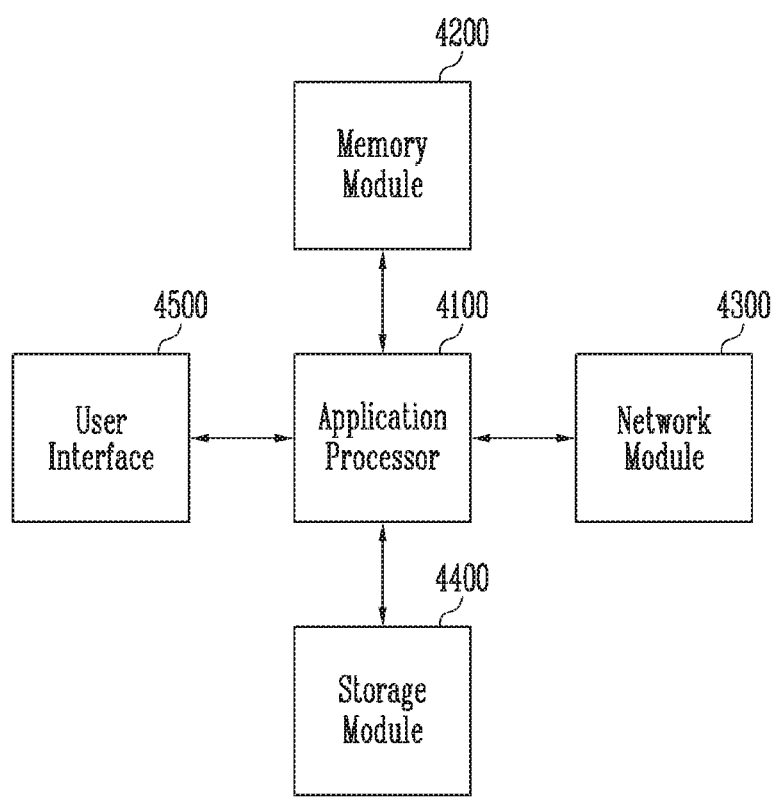
FIG. 16 is an example of a block diagram illustrating a user system to which a storage device is applied in accordance with an embodiment of the disclosed technology.

FIG. 16 is a block diagram illustrating a user system to which the storage device is applied in accordance with an embodiment of the disclosed technology.

Referring to FIG. 16, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the disclosed technology, there can be provided a storage device having improved data recovery capability and an operating method thereof.

While the disclosed technology has been shown and described with reference to certain exemplary embodiments thereof, it will be understood by those skilled in the art that various changes in form and details may be made therein without departing from the spirit and scope of the disclosed technology as defined by the appended claims and their equivalents. Therefore, the scope of the disclosed technology should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the disclosed technology, and the disclosed technology is not limited thereto. That is, it should be apparent to those skilled in the art that various modifications can be made on the basis of the technological scope of the disclosed technology.

Meanwhile, the exemplary embodiments of the disclosed technology have been described in the drawings and specification. Although specific terminologies are used here, those are only to explain the embodiments of the disclosed technology. Therefore, the disclosed technology is not restricted to the above-described embodiments and many variations are possible within the spirit and scope of the disclosed technology. It should be apparent to those skilled in the art that various modifications can be made on the basis of the technological scope of the disclosed technology in addition to the embodiments disclosed herein.

What is claimed is:

1. A memory controller for controlling one or more memory devices including a source stripe and a target stripe, the memory controller, comprising:
   an operation controller configured to control the memory devices to perform read operations on first to third source pages and a source parity page in the source stripe and perform program operations on first to third target pages and a target parity page in the target stripe;
   a program data determiner configured to determine first to third program data to be respectively programmed in the first to third target pages based on a success of each of the read operations on the first to third source pages, and to determine data read successfully from the first and second source pages as the first and second program data and determine recovery data as the third program data upon whether the read operation for the third source page has failed; and a parity calculator configured to generate calculation data by using the first and second program data, and generate the recovery data by using source parity data stored in the source parity page and the calculation data.

2. The memory controller of claim 1, wherein each of the first to third source pages and the source parity page are included in different memory devices, and
each of the first to third target pages and the target parity page are included in different memory devices.

3. The memory controller of claim 1, wherein the parity calculator is configured to generate target parity data based on the calculation data and the recovery data.

4. The memory controller of claim 3, wherein the operation controller is configured to control the one or more memory devices to store the recovery data in the third target page and to store the target parity data in the target parity page.

5. The memory controller of claim 1, wherein the parity calculator is configured to generate the calculation data after the first and second program data are determined.

6. The memory controller of claim 1, wherein the parity calculator is configured to generate the calculation data before the read operation for the third source page has failed.

7. The memory controller of claim 1, wherein the parity calculator is configured to generate the recovery data upon receiving a determination that the read operation for the third source page has failed.

8. The memory controller of claim 1, wherein the parity calculator is configured to generate the calculation data by performing an XOR calculation on the first and second program data.

9. The memory controller of claim 1, further comprising an Error Correction Code (ECC) decoder configured to perform an error correction decoding to determine the success of each of the read operations on the first to third source pages.

10. A storage device, comprising:
one or more memory devices configured to perform read operations on first to third source pages and a source parity page, and perform program operations on first to third target pages and a target parity page; and
a memory controller in communication with the one or more memory devices and configured to:
determine whether the read operations on the first to third source pages have been successful,
determine data read from the first and second source pages whose read operation has been successfully performed as first and second program data, respectively,
generate calculation data by using the first and second program data,
generate recovery data based on source parity data read from the source parity page and the calculation data, and
determine the recovery data as third program data upon a determination that the read operation on the third source page is not successful,
wherein the first to third program data are to be respectively programmed in the first to third target pages.

11. The storage device of claim 10, wherein the source parity page is configured to store the source parity data obtained by performing an XOR calculation on data stored in the first to third source pages, and
the target parity page is configured to store target parity data obtained by performing an XOR calculation on the first to third program data.

12. The storage device of claim 10, wherein the first to third source pages and the source parity page are included in different memory devices, and
the first to third target pages and the target parity page are included in different memory devices.

13. The storage device of claim 10, wherein the memory controller is configured to control the memory devices to store the recovery data in the third target page and the target parity data in the target parity page.

14. The storage device of claim 10, wherein the memory controller is configured to generate the calculation data by performing XOR calculation on the first and second program data and generate the target parity data based on the calculation data and the recovery data.

15. The storage device of claim 10, wherein the memory controller is configured to generate the calculation data before the read operation for the third source page has failed.

16. The storage device of claim 10, wherein the memory controller is configured to generate the calculation data while the first and second program data are being programmed in the first and second target pages.

17. A method for operating a memory controller in communication with one or more memory devices, the method comprising:
providing read commands for reading first to third source pages and a source parity page in a source stripe to the one or more memory devices;
determining data read from the first and second source page on which read operations have been successful as first and second program data;
generating calculation data by using the first and second program data;
providing program commands for storing the first and second program data in first and second target pages in a target stripe to the one or more memory devices; and
generating recovery data by using source parity data read from the source parity page and the calculation data depending on whether a read operation on the third source page fails.

18. The method of claim 17, wherein each page in the source stripe is included in difference memory devices, and
wherein each page in the target stripe is included in difference memory devices.

19. The method of claim 17, further comprising:
providing program commands for storing the recovery data in a third target page of the target stripe to the one or more memory devices; and
providing program command for storing a target parity data generated based on the calculation data and the recovery data in a target parity page of the target stripe to the one or more memory devices.

20. The method of claim 17, wherein the calculation data is generated by an XOR calculation on the first and second program data, and
wherein the recovery data is generated by an XOR calculation on the source parity data and the calculation data.

* * * * *